July 4, 1972 N. I. KORMAN 3,674,364
METHOD AND APPARATUS FOR EVALUATING COLOR TRANSPARENCIES AND THE LIKE
Filed March 16, 1970 2 Sheets-Sheet 1

INVENTOR.
NATHANIEL I. KORMAN
BY
Ostrolenk, Faber, Gerb & Soffen
ATTORNEYS

July 4, 1972 N. I. KORMAN 3,674,364

METHOD AND APPARATUS FOR EVALUATING COLOR TRANSPARENCIES AND THE LIKE

Filed March 16, 1970 2 Sheets-Sheet 2

INVENTOR.
NATHANIEL I. KORMAN

BY

Ostrolenk, Faber, Gerb & Soffen

ATTORNEYS

United States Patent Office 3,674,364

Patented July 4, 1972

3,674,364

METHOD AND APPARATUS FOR EVALUATING COLOR TRANSPARENCIES AND THE LIKE

Nathaniel I. Korman, Princeton, N.J., assignor to Ventures Research & Development Group, Princeton, N.J.

Filed Mar. 16, 1970, Ser. No. 19,972

Int. Cl. G03b *27/76*

U.S. Cl. 355—38 10 Claims

ABSTRACT OF THE DISCLOSURE

Equipment for evaluating color transparencies utilizing a color kinescope whose intensity and color mix are readily adjustable. The transparency being evaluated is compared against "standard" transparencies, whereby the grid bias voltages of the three-gun kinescope are adjusted to achieve favorable comparison between the transparency being evaluated and the "standard." The values of the three kinescope beam currents necessary to obtain the proper color balance and luminance are employed in mathematical relationships to determine the preparation of color separations (for example) from the transparency being evaluated, which calculations may be performed by computer means, which may either be analog or digital in nature.

The present invention relates to color transparencies, and more particularly to a novel method and apparatus for evaluating color transparencies to prepare color separations, and the like.

A variety of techniques presently exists for evaluation of color transparencies in order to prepare color separations which may, for example, be employed in the preparation of printing plates to print small or large quantities of the original transparency with the requisite fidelity. The present invention is characterized by providing a highly reliable, semi-automatic apparatus and method for the evaluation of color transparencies. The present invention employs a color kinescope which is adjustable in both intensity and color to enable the subjective determination of color correction desired in the color transparency being evaluated. The values of the beam currents which result when the desired color correction has been determined, are automatically set into computational apparatus (which may be either analog or digital in nature) for calculation of the settings for each color channel in a color separation scanner. Apparatus and methods may also be employed for adjusting the color of localized areas of the color transparency being evaluated by means of preselected color dyes which may either be applied to a transparent sheet positioned adjacent the color transparency being evaluated or directly to the transparency itself. Calculation of the settings required in a color scanner may be appropriately modified through the computational scheme and/or hardware to accommodate different varieties of color scanners. For example, the values obtained may be modified to be equal to the logarithm or other function of the intensity, when required to make the calculated values conform to the particular color scanner employed.

It is, therefore, one object of the present invention to provide a novel method and apparatus for use in evaluating color transparencies wherein a color kinescope, whose color mix and intensity is readily adjustable, is employed as a means for subjectively adjusting the color balance of a transparency being evaluated to enable the kinescope beam current values to be employed directly and automatically into a computer apparatus (of either the analog or digital type) to obtain the necessary values employed to control the adjustment of a color scanner.

This as well as other objects of the present invention will become apparent when reading the accompanying description and drawings in which.

Figure 1:
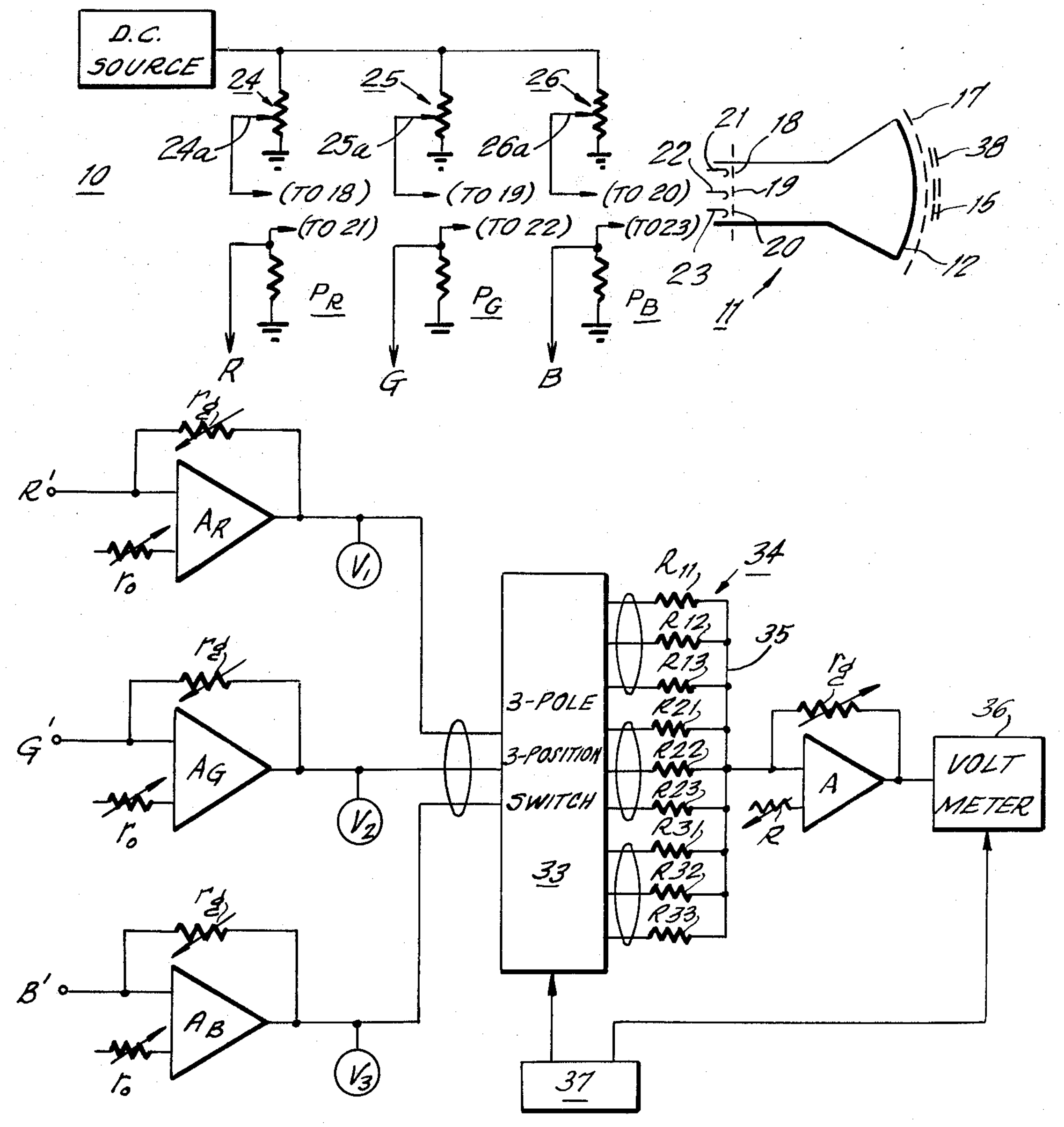
FIG. 1 is a block diagram of a transparency evaluation system designed in accordance with the principles of the present invention.

The editing equipment 10 in FIG. 1 may be employed for evaluating color transparencies and determining how they should be modified. The evaluation is performed by means of a color kinescope designated generally by the numerial 11, which device is utilized as a light source whose intensity and color is readily adjustable.

Figure 3:
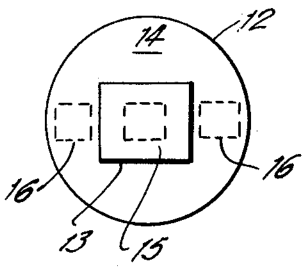
FIG. 3 is a front view of the color kinescope portion of the apparatus of either FIG. 1 or 2 showing the manner in which color transparencies being evaluated may be subjectively compared with "standard" transparencies.

In order to determine how the color balance of a given positive color transparency should be altered to yield a more desirable picture, the face 12 of the kinescope (see also FIG. 3) is divided into two areas: a central areas 13 employed for viewing the transparency being evaluated and a peripheral area 14 for viewing standard transparencies. The standard transparencies may typically consist of scenes of landscapes, foliage, people, fruit, flowers, and the like. The color of peripheral area 14 upon the kinescope face 12 is kept white, while the color of the central area is made adjustable. As one simplified manner for obtaining this, the color kinescope face may occupy only the regions designated by the numeral 13 in FIG. 3, while the surrounding area may be a peripheral framing portion lighted by a source which is independent of the kinescope source.

In operation, a positive color transparency 15, which is to be evaluated, is laid upon the central area 13 of the kinescope. One or more "standard" transparencies 16 may be laid upon appropriate portions of the peripheral area 14, preferably in reasonably close proximity to transparency 15 to expedite evaluation. The color and intensity of the central area 13 of kinescope 11 is adjusted to obtain what is, in the judgment of the operator, the most desirable color balance for the picture. The standard transparencies 16 arranged around peripheral area 14 serve to provide standard color references for the operator. This is most desirable, since the human eye possesses a better sense of relative color than that which may be obtained through artificial or mechanical methods or apparatus.

The face of the kinescope may be divided into the two areas 13 and 14, described hereinabove, or, alternatively, the entire face of the kinescope may be used for viewing the transparency being evaluated, as was also described hereinabove. In the alternative case, the peripheral area 14 beyond the kinescope face is preferably illuminated with a standard white light to facilitate viewing "standard" reflection pictures.

Referring more specifically to FIG. 1, the color kinescope 11 is powered and driven by conventional circuitry (not shown herein in detail for purposes of simplicity) in order to generate a raster which fills the screen area 13 with light. While the normal precautions should preferably be taken to produce light of constant intensity and color on every part of the kinescope face, a diffusing screen 17 may be positioned between the kinescope face and the transparency 15 in order to smooth out any residual differences.

The color and intensity of the light emitted from the face of kinescope 11 is adjusted by means of the bias voltages applied to the control grids 18, 19 and 20 of the three electron guns 21 through 23, respectively, provided in the color kinescope. The bias voltages applied to each control grid are, in turn, controlled by the adjustment of three potentiometers 24 through 26, respectively, whose adjustable arms 24a through 26a, respectively, may be appropriately moved to contact the resistive element portion $P_R$, $P_G$ and $P_B$ of each of the potentiometers 24 through 26, respectively. The potentiometers are adjusted by the operator by means of control knobs which may be provided at a convenient place upon a kinescope control panel (not shown) to enable the operator to adjust the control knobs in order to determine the proper color balance and luminance level for the transparency 15 being evaluated.

The amount of red, green and blue light which has been found to give the proper color balance and luminance are measured at the terminals R, G and B, respectively, which terminals are electrically connected to the cathode resistors 27, 28 and 29, respectively. The voltages appearing at terminals R, G and B are proportional to the beam currents in the three respective electron guns of the color kinescope. These voltages, in turn, are proportional to the amount of red, green and blue light excited upon the face of the kinescope, which may, for example, be of the shadow-mask type. However, any other type of red, green and blue mosaic may be employed.

The voltages at terminals R, G and B are coupled, respectively, to the input terminals R′, G′ and B′ where they are amplified in amplifiers $A_R$, $A_G$ and $A_B$, respectively. These amplifiers are each provided with controls $r_o$ and $r_g$ which are adjustable so as to provide zero and unity output at each of the voltmeters $V_1$, $V_2$ and $V_3$ connected at the outputs of the amplifiers, so that the zero and unity output voltages may be measured and the appropriate adjustments made for those cases when the kinescope is cut off and when its light luminance and color matches that of the standard source, respectively. The kinescope, the various controls, and the amplifiers and power supplies selected for the circuitry should be stable enough so that adjustment of the control potentiometers $r_o$ and $r_g$ need only be made at rather infrequent intervals.

The outputs of each of the amplifiers are coupled to selected inputs of a three-pole multiposition switch, shown in block diagram form and generally designated by the numeral 33. Selected outputs of the three-pole multiposition switch 33 are connected to associated resistors $R_{11}$ through $R_{33}$ of a resistance summing network 34. The opposite terminals of each of the resistive elements are connected in common to a common bus 35 which, in turn, is connected to the input terminal of an amplifier A (also having adjustable resistive elements $r_g$ and $r_o$). The output terminal of amplifier A is connected to the input of a measuring voltmeter 36. These components, in combination, comprise an analog computer for the solution of the following set of equations:

$$R' = a_{11}R + a_{12}G + a_{13}B \quad (1)$$

$$G' = a_{21}R + a_{22}G + a_{23}B \quad (2)$$

$$B' = a_{31}R + a_{32}G + a_{33}B \quad (3)$$

Equations 1 through 3 pertain, for example, to the situation where a color scanner is to be used for the preparation of color separations from the original transparency. In such a situation, the response of each of the red, green and blue channels of the scanner R′, G′ and B′ is proportional, respectively, to some linear combination of the amounts of red, green and blue light R, G and B required to give the proper color balance for the transparency. The coefficients of this set of equations is dependent upon the spectral characteristics of the three phosphors of the color kinescope as well as the spectral characteristics of the color filter utilized in the color separation scanner.

In operation, the three-pole multiposition switch 33 would be set in its first position. In this position, the resistors $R_{11}$, $R_{12}$ and $R_{13}$ have their left-hand terminals electrically connected to the outputs of amplifiers $A_R$, $A_G$ and $A_B$, respectively. The resistors thus control the proportions in which the voltages representing R, G and B are added at the input to amplifier A. If these resistors had been previously adjusted to be proportioned to the coefficients $a_{11}$, $a_{12}$ and $a_{13}$, respectively, of Equation 1, the resultant voltage at the input to amplifier A would be proportional to R′ of Equation 1. This voltage, after being amplified in amplifier A (whose gain has been set by resistor $r_g$) is read by voltmeter 36. The voltmeter reading is recorded and subsequently used to set the gain of the red channel of the color separation scanner.

Multiposition switch 33 is next set in its second position to couple resistors $R_{21}$ through $R_{23}$ to amplifiers $A_R$, $A_G$ and $A_B$, respectively, in order that the value of G′ in Equation 2 may be obtained. The switch would then be set in the third position in a similar manner. In each of the second and third positions, the voltage readings are recorded and are subsequently employed to set the gains of the green and blue channels, respectively, of the color separation scanner.

The embodiment of FIG. 1 may be arranged to operate automatically by substituting for voltmeter 36 a recording digital voltmeter and by replacing multiposition switch 33 with a switch means having automatic advancement means, such as advancement means 37, which is designed to set switch 33 in its first position and apply an enabling control signal to voltmeter 36 to record the reading for that setting, and to advance to the second and third positions of the switch and further apply enabling control signals to the recording digital voltmeter to make permanent recordings of each of the values G′ and B′ of Equations 2 and 3, respectively, in a similar manner.

In the cases where the controls of the color separation scanner are not presented in terms of the amounts of red, green and blue light intensities, or in terms of some linear combination of these intensities, the functional relationship of the scanner controls would have to be simulated in the computer of the editor. For example, the scanner controls might be applied to the logarithms of the intensities. In such a case, the appropriate logarithmic amplifiers would have to be included in the computer of the editor wherein the solutions for the Equations 1 through 3 are converted into their logarithmic values.

After the best overall color balance for the picture has been determined, it may be desirable to adjust the color of certain local areas of the transparency. This may be accomplished by placing a transparent plastic sheet 38 upon the color transparency 15 (see FIG. 1) and applying to this plastic sheet appropriate colored dyes in those local areas until the desired corrections are observed to have been effected. The dyes may be applied by paint brush, air brush or other suitable means. After making the local changes, the overall color balance and intensity may be readjusted, as described hereinabove. The transparent plastic sheet is kept in position over the color transparency in subsequent operation with the transparency. Alternatively, the dyes may be applied directly to one surface of the color transparency in those localized areas where a particular color adjustment may be desired.

The editing equipment described hereinabove may also be used in the preparation of color separations which, in turn, may be employed in the preparation of printing plates for use with yellow, magenta and cyan inks. In the case of ideal inks: the yellow ink absorbs only red light and its separation would be prepared by exposing a photographic film through the color transparency with red light; exposing the magenta ink with green light; and exposing the cyan ink with red light. For practical inks, however, the yellow ink absorbs some blue and green light in addition to absorbing red light, and its separation should be prepared by exposing a photographic film through the color transparency with light which is predominantly red, but has the proper amounts of blue and green light added. The cyan and magenta separation may be prepared similarly by exposure through the color transparency with proper mixtures of red, green and blue light. The photographic film employed must be panchromatic, i.e., uniformly sensitive to all colors of light. If it is only approximately uniformly sensitive, appropriate changes in the colors of the exposure light can be made to compensate for the non-uniformity. Since the proportions of red, green and blue illumination for the desired color balance have been set in the procedures described hereinabove, the proper exposure of the film to account for the printing ink and film sensitivity factors can be achieved by calculating and employing the required exposure times for the red, green and blue components of the light from the kinescope.

The above procedure for preparing color separations may be described more quantitatively as follows:

"Ideal" cyan ink should absorb practically all of the red light, but none of the green and blue light. Similarly, "ideal" magenta and yellow inks would absorb practically all of the green and blue light, respectively, and no other light. Practical inks, however, do not absorb all the light they should and in fact absorb some of the light that they should not absorb. This situation is summarized for a set of practical inks in the following table:

| | Red density | Green density | Blue density |
|---|---|---|---|
| Cyan ink | 1.30 | 0.41 | 0.15 |
| Magenta ink | 0.11 | 1.05 | 0.57 |
| Yellow ink | 0.01 | 0.07 | 1.00 |

Since density is defined as the logarithm of the reciprocal of the amount of light; i.e., $$D_R=\log\frac{1}{R};\ D_G=\log\frac{1}{G};\ D_B=\log\frac{1}{B} \qquad (4)$$

and defining C, M and Y as the density, or logarithm of the relative amount of area covered by the ink, of the cyan, magenta and yellow inks, respectively, this table may be expressed in mathematical form by the following set of equations:

$$D_R=1.30C+0.11M+0.01Y \qquad (5)$$

$$D_G=0.41C+1.05M+0.07Y \qquad (6)$$

$$D_B=0.15C+0.57M+1.00Y \qquad (7)$$

This set of equations may be solved for C, M and Y with the result that:

$$C=.80D_R-.08D_G \qquad (8)$$

$$M=.31D_R-1.02D_G-.07D_B \qquad (9)$$

$$Y=.07D_R-.57D_G+1.04D_B \qquad (10)$$

The positive quantities in this set of equations indicate the amount of exposure that should be made with the appropriately colored light through the original transparency. The negative quantities indicate a negative exposure and are accomplished by the insertion of a mask of the proper density. The masks are made in the same manner as the separations, i.e., by exposing and developing the film to the appropriate density. For example, the magenta separation would be made by first making a mask by exposing film through the transparency to red and blue light so the densities of 0.31 and 0.07 would be reached for these respective colors. After development, the magenta separation would be made by exposing film to green light to a density of 1.02 through the original transparency and with the first mentioned mask being placed in juxtaposition.

The numerical coefficients employed in the above equations are purely illustrative. In practice, the coefficients depend not only on the particular inks employed in the final printing process, but also on the spectral characteristics of the colored lights used in the process.

Figure 2:
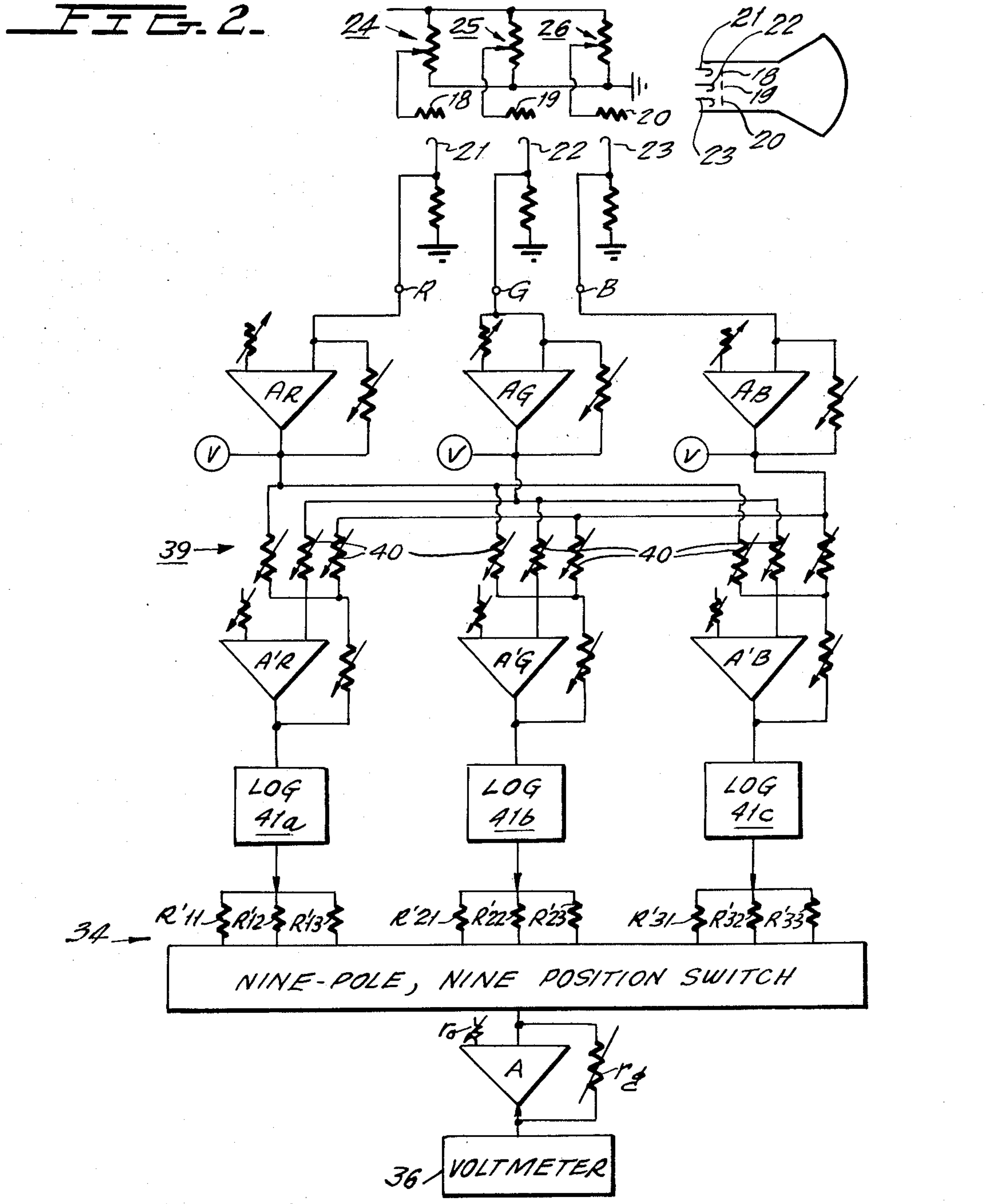
FIG. 2 shows a block diagram of an alternative embodiment of the present invention for use in evaluating color transparencies.

A system for use where the color separation is to be made by photographic masking methods in shown in FIG. 2 wherein similar elements as between FIGS. 1 and 2 are designated by like numerals. The operation of the system of FIG. 2 up to the point of amplifiers $A_R$, $A_G$ and $A_B$ is the same as described hereinabove with regard to FIG. 1. The output signals developed by amplifiers $A_R$, $A_G$ and $A_B$ are combined in a resistor network 39 comprised of a plurality of adjustable resistor elements 40 so that appropriate proportions of the output signals are summed in each of the amplifiers $A_{R'}$, $A_{G'}$ and $A_{B'}$ to transform from the color coordinate system of the kinescope to that of the light to be used for film exposure. The outputs of each of the amplifiers $A_{R'}$, $A_{G'}$ and $A_{B'}$ are connected as inputs to logarithmic amplifiers or devices whose outputs generate signals which are equal to the logarithm of the input signals applied thereto in order to obtain signals proportional to density.

The outputs of each of the logarithmic devices **41*a* through 41*c* are coupled through resistive summing network 34 to appropriate input terminals of a nine-position switch which connects the appropriate density signal (of the red, green or blue component of the kinescope light) through an associated resistor $R_{ii'}$ where the values are summed and applied to the input of amplifier A. The output of amplifier A is read by voltmeter 36**. The values of the resistors $R_{ii'}$ are chosen to correspond with the coefficients of Equations 8 through 10. Thus, when the switch is in its first position, the appropriate resistor $R_{11'}$ and the value of $D_R$ would determine the reading of the voltmeter which, in turn, would indicate the amount of exposure to red light required for the cyan separation. When the switch is in the second position, resistor $R_{12'}$ and the value of $D_R$ would determine the amount of exposure to red light required for the red mask in order to obtain the magenta separation. Each of the remaining seven values would be obtained in a similar fashion.

Summarizing, the method steps for obtaining color separations are as follows:

The color transparency to be evaluated is positioned upon the face of the kinescope whose electron guns are adjusted by the previously mentioned controls until the proper color balance is achieved.

In accordance with the spectral characteristics of the inks and colored lights employed in the process, the appropriate density values as set forth, for example, in the above-mentioned chart, are set into the computational apparatus as shown in FIG. 2 by appropriate adjustment of the adjusatble resistors in summing network 34. Each exposure value is then obtained for the amount of red, green and blue light to which each of the inks (yellow, cyan and magenta) should be exposed, there being a total of nine values in all. Once these values are obtained through the apparatus of FIG. 2, the appropriate masks may then be prepared through the use of the color kinescope by adjusting the grid control voltage values and then connecting a timer 42 to time the length of the exposure in accordance with the exposure values obtained by controlling the length of time that the D.C. supplies which are employed to bias the kinescope are to remain on. After the formation of each of the appropriate masks, each separation is then made by exposing the color transparency by the appropriate light with the appropriate masks being in juxtaposition therewith.

The editing equipment described hereinabove may also be used in the screening of color separations. Screening is a necessary step toward the creation of a printing plate. In the performance of screening, for every elemental area or cell, the density of the separations are converted, cell by cell, into black areas proportional in area to the density in the cell. Screening of the color separations can be accomplished by passing light through them and through a grating onto a high gamma film. In each cell of the grating, the light transmission is a maximum at the center and tapers off to zero at the edges. The shape of the transfer function, i.e., the size of the black area in each cell as a function of the density of the color separation at the cell location, can be controlled by the way in which the light transmission varies from the center to the edges of the grating cell. The screening step can be combined with the separation step by placing the color transparency, the correction sheet, a grating, and a high gamma film in close contact with each other and exposing them to the appropriate colored light as described above. The high gamma film should be panchromatic, and the exposure times properly calculated and used.

Figure 4:
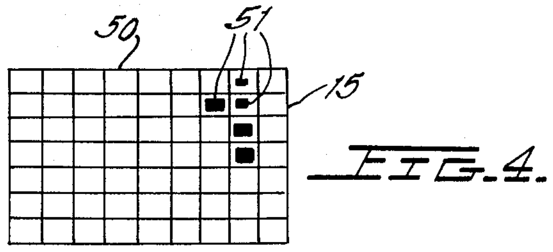
FIG. 4 is a plan view of a grating which may be used with the apparatus of FIG. 2.

FIG. 4 shows a grating 50 positioned upon the color transparency 15 and showing some of the black areas 51 mentioned hereinabove, which black areas are proportional in area to the density of their associated cells for a particular one of the plurality of color separations. The screening step is combined with the separation step by placing the color transparency, the correction sheet, the grating and the high gamma film in close contact with one another, then exposing them to the appropriately colored light, thereby performing the screening and separating operations into a single step and obtainnig each of the color separations in a similar manner.

It can be seen from the foregoing description that the present invention provides a novel method and apparatus for determining color correction either desired or required for a color transparency and for preparing color separations of a color transparency through the use of an adjustable color kinescope and associated computational circuitry.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. Means for evaluating color transparencies and the like to determine the desired color correction comprising:

a color kinescope having a screen whose front face is adaptable for viewing a color transparency under evaluation, which transparency is placed upon the face of said screen;

a multi-gun electron gun structure for illuminating said screen;

plural adjustable means each associated with one electron gun of the multi-gun structure for controlling the intensity of each electron gun of said electron gun structure to thereby control the intensity and resultant color of the screen illuminated by said electron gun structure;

first means coupled to each of said electron gun means for providing an output representative of the light intensity of its associated gun;

a supporting surface adjacent said front face and adapted for viewing standard transparencies to aid in the color correction of the transparency under evaluation;

means for illuminating said supporting surface with white light to illuminate the standard transparencies;

at least one standard transparency positioned upon said supporting surface and adjacent said color transparency under evaluation;

second means coupled to each of said first means for determining the color settings required in a color scanner to produce the color separations.

2. The means of claim 1 further comprising means coupled to each of said first means for generating a signal representing the contribution which each color of the color kinescope makes to each color channel of a color scanner;

means for each color channel for summing those signals which contribute to the same color channel to provide resultant signals which represent the color correction settings for obtaining the color balance achieved through the use of the color kinescope.

3. The means of claim 1 further comprising second means for solving the equations $$R'=a_{11}R+a_{12}G+a_{13}B$$

$$G'=a_{21}R+a_{22}G+a_{23}B$$

$$B'=a_{31}R+a_{32}G+a_{33}B$$

where R, G and B equal the color values derived from the first means for each color of the kinescope and $a_{11}$–$a_{33}$ are the coefficients which relate the spectral characteristics of the color kinescope colors to the color separations of a color scanner;

said second means including means for forming the products of the above equations and means for summing selected ones of the said products to obtain the values R′, G′ and B′.

4. The means of claim 1 further comprising second means coupled to each of said first means for determining the color settings required for each gun of said kinescope to produce the masks required to compensate for the color characteristics of the inks.

5. The means of claim 4 further comprising timing means for timing the exposure of each color of said kinescope to produce the required masks in accordance with the exposure times calculated by said second means.

6. A method for determining the color correction desired for a color transparency through a color kinescope by comparison against one or more standard transparencies comprising the steps of:

(a) placing a color transparency upon the face of the color kinescope;

(b) illuminating at least one standard transparency by white light and positioning the illuminated standard transparency adjacent the color transparency being evaluated;

(c) adjusting the bias voltages for each electron gun of the color kinescope to obtain the desired color balance by comparing the color transparency against the standard transparency;

(d) generating cathode current intensities representing the values required to obtain the desired color correction;

(e) electronically calculating the adjustments necessary for use in a color separation scanner from said cathode current intensities.

7. The method of claim 6 wherein step (e) is further comprised of the steps of solving the equations $$R'=a_{11}R+a_{12}G+a_{13}B$$

$$G'=a_{21}R+a_{22}G+a_{23}B$$

$$B'=a_{31}R+a_{32}G+a_{33}B$$

where R, G and B are the cathode current intensities for each color in the kinescope, and $a_{11}$–$a_{33}$ are the coefficients which represent the relative effect of each kinescope color upon the color channels of the color scanner to control the adjustment of each color channel in the scanner.

8. The method of claim 7 further comprising the steps of:

masking the color transparency being evaluated in those areas which require additional color correction by placing color dyes of the appropriate colors directly upon the aforesaid areas.

9. The method of claim 7 further comprising the steps of:

masking the color transparency being evaluated in those areas which require additional color correction by placing a transparent sheet upon said color transparency applying dyes in the appropriate amounts and colors to said overlay in said areas requiring additional color correction, whereby said sheet is utilized together with the color transparency during subsequent color separation thereof.

10. A method for preparing color separations from a color transparency evaluated through the use of a color kinescope by comparison against one or more standard transparencies comprising the steps of:

(a) placing a color transparency upon the face of the color kinescope;

(b) illuminating at least one standard transparency by white light and positioning the illuminated standard transparency adjacent the color transparency being evaluated;

(c) adjusting the bias voltages for each electron gun to obtain the desired color balance;

(d) generating cathode current intensities of each electron gun of the color kinescope which contribute to the desired color balance;

(e) electrically solving the equations:

$$C = a_{11}D_R + a_{12}D_G + a_{13}D_B$$

$$M = a_{21}D_R + a_{22}D_G + a_{23}D_B$$

$$Y = a_{31}D_R + a_{32}D_G + a_{33}D_B$$

where $D_R$, $D_G$ and $D_B$ are the density values equal to the logarithm of the reciprocal of the values obtained from each color gun in step (d) above, $a_{11}$–$a_{33}$ are the coefficients which relate the spectral characteristics of each color of the color kinescope to the exposure times required for the inks used, and where C, Y and M represent the densities of the cyan, magenta and yellow inks required in the final color printing process;

(f) producing masks of the appropriate density for each of the exposure values calculated in step (e) above by exposing panchromatic film to light emitted from the associated color gun of the color kinescope and passing through the color transparency under evaluation wherein the exposure times of the color gun is determined by the exposure values of step (e);

producing each color separation by exposing the color transparency to the appropriate light with the appropriate masks in juxtaposition therewith.

References Cited

UNITED STATES PATENTS

| | | | |
|---|---|---|---|
| 2,565,399 | 8/1951 | Simmon | 355—20 |
| 2,912,487 | 11/1959 | Horsley | 178—5.2 |

SAMUEL S. MATTHEWS, Primary Examiner

R. A. WINTERCORN, Assistant Examiner

U.S. Cl. X.R.

178—5.2 A; 356—175, 179, 195